United States Patent
Kawata et al.

(10) Patent No.: US 9,786,895 B2
(45) Date of Patent: Oct. 10, 2017

(54) ENERGY STORAGE MODULE WITH REDUCED DAMAGE TO ELECTRODE TERMINALS

(71) Applicant: HONDA MOTOR CO., LTD, Minato-ku, Tokyo (JP)

(72) Inventors: Masao Kawata, Sakura (JP); Atsushi Sakurai, Moka (JP); Makoto Wada, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 14/796,174

(22) Filed: Jul. 10, 2015

(65) Prior Publication Data

US 2016/0013467 A1    Jan. 14, 2016

(30) Foreign Application Priority Data

Jul. 11, 2014    (JP) ................................. 2014-143194

(51) Int. Cl.
*H01M 6/42* (2006.01)
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC ............... H01M 2/206; H01M 2/1077; H01M 10/0525; H01M 2220/20

USPC ........................................................ 429/159
See application file for complete search history.

(56) References Cited

U.S. PATENT DOCUMENTS

2010/0081041 A1    4/2010   Okada et al.
2011/0076521 A1*   3/2011   Shimizu .............. H01M 2/1061
                                                     429/7

FOREIGN PATENT DOCUMENTS

| JP | 2001-160390 | 6/2001 |
|----|----|----|
| JP | 2008-269924 | 11/2008 |
| JP | 2010-080353 | 4/2010 |
| JP | 2011-076936 | 4/2011 |

OTHER PUBLICATIONS

Japanese Office Action for Japanese Patent Application No. 2014-143194 mailed on Dec. 6, 2016.

* cited by examiner

*Primary Examiner* — Gary Harris
(74) *Attorney, Agent, or Firm* — Amin, Turocy & Watson LLP (57) ABSTRACT

An energy storage module includes an energy storage cell group containing a plurality of energy storage cells stacked in a stacking direction, and a pair of end plates provided at both ends of the energy storage cell group in the stacking direction. A terminal frame is provided at the end plate in order to electrically connect an electrode terminal of the energy storage cell provided at an end in the stacking direction and an output line. The terminal frame is fixed to the end plate by fixing points.

12 Claims, 12 Drawing Sheets

ENERGY STORAGE MODULE WITH REDUCED DAMAGE TO ELECTRODE TERMINALS

CROSS-REFERENCE TO RELATED APPLICATION

This application is based upon and claims the benefit of priority from Japanese Patent Application No. 2014-143194 filed on Jul. 11, 2014, the contents of which are incorporated herein by reference.

BACKGROUND OF THE INVENTION

Field of the Invention

The present invention relates to an energy storage module including an energy storage cell group formed by stacking a plurality of energy storage cells in a stacking direction and a pair of end plates provided at both ends of the energy storage cell group in the stacking direction to hold the energy storage cells of the energy storage cell group together.

Description of the Related Art

In general, an energy storage module including an energy storage cell group formed by stacking a plurality of energy storage cells is known. For example, this energy storage module is mounted in an electrically driven vehicle such as a hybrid vehicle or EV. To this end, the high output voltage is achieved by stacking a large number of energy storage cells.

In the energy storage module, a negative (−) electrode terminal of one of the adjacent energy storage cells and a positive (+) electrode terminal of the other of the adjacent energy storage cells are electrically connected in series by a bus bar. An output line is electrically connected to an electrode terminal of an energy storage provided at one end in the stacking direction.

At the output line, it is required to reduce connection resistance, in particular, for outputting a large amount of electrical current. Normally, the connector terminal of the output line is tightened and held by applying a strong tightening torque to the electrode terminal of the energy storage cell. Therefore, since a large rotational torque is applied to the electrode terminal, the electrode terminal may be damaged undesirably.

In this regard, for example, a battery system disclosed in Japanese Laid-Open Patent Publication No. 2010-080353 is known. In this battery system, a battery cell block formed by stacking a plurality of battery cells is fixed in the stacking direction using a pair of end plates.

The output line is connected to the electrode terminal of the battery cell through a relay bus bar, and a connector terminal of the output line is connected to the relay bus bar using a locking screw and a nut. The nut is unrotatably fixed to the end plate. The locking screw is screwed into this nut to connect the relay bus bar and the connector terminal of the output line for fixing the output line to the end plate.

SUMMARY OF THE INVENTION

In the above battery system, at the time of performing operation to connect the output line, in an attempt to prevent damage to the electrode terminal of the battery cell, firstly, the connector terminal of the output line is connected to the relay bus bar. Then, it is required to connect the electrode terminal of the battery cell to the relay bus bar.

At the time of performing an operation to remove the output line, firstly, it is required to untighten the electrode terminal of the battery cell from the relay bus bar, and then, it is required to untighten the connector terminal of the output line from the relay bus bar. Therefore, connecting and removing operations have constraints, and the entire operation is laborious.

Further, at the time of conducting maintenance operations, the relay bus bar needs to be untightened. As a result, the number of steps involved in conducting maintenance operations needs to be increased, and precise torque control is required. Accordingly, maintenance operations cannot be performed efficiently.

The present invention solves the problems of this type, and an object of the present invention is to provide an energy storage module which makes it possible to simplify and improve the efficiency of the operations as a whole, and reduce and/or eliminate damage of electrode terminals as much as possible.

An energy storage module according to the present invention includes an energy storage cell group containing a plurality of energy storage cells stacked in a stacking direction and a pair of end plates provided at both ends of the energy storage cell group in the stacking direction to hold the energy storage cells of the energy storage cell group together. In this energy storage module, a terminal frame is provided at the end plate. The terminal frame electrically connects an electrode terminal of the energy storage cell provided at an end in the stacking direction and an output line. The terminal frame has a line connector connected to the output line, and the terminal frame is fixed to the end plate by a plurality of fixing points.

In the present invention, the terminal frame electrically connecting the electrode terminal of the energy storage cell and the output line has the line connector connected to the output line. The terminal frame is fixed to the end plate by the plurality of fixing points. In the structure, at the time of fixing the output line to the line connector by tightening a nut, etc., the terminal frame is not rotated, thereby avoiding torque induced damage.

Thus, even if the terminal frame and the output line are connected after the electrode terminal of the energy storage cell and the terminal frame are connected, damage to the electrode terminal is prevented. Accordingly, it becomes possible to simplify, and improve the efficiency of operation such as maintenance operation as a whole. Further, damage of the electrode terminal can be reduced as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
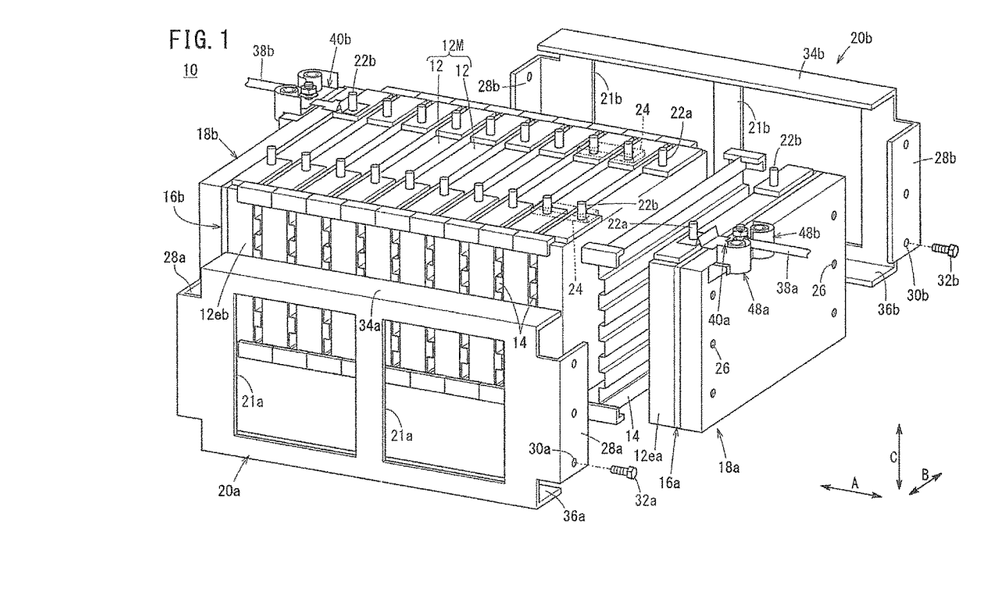
FIG. 1 is an exploded perspective view showing an energy storage module according to a first embodiment of the present invention.

FIG. 1 illustrates an energy storage module 10 according to a first embodiment of the present invention.

The energy storage module 10 includes an energy storage cell group 12M formed by stacking a plurality of energy storage cells 12 in a horizontal direction indicted by an arrow A. Each of the energy storage cells 12 has a rectangular shape. The energy storage cells 12 are placed upright, and in this state, the energy storage cells 12 and insulating separators (holders) 14 are stacked together alternately in the direction indicated by the arrow A. The separators 14 can have a corrugated shape in a side view.

At both ends of the energy storage cell group 12M in the stacking direction, insulator plates (or separators 14) 16a, 16b having a heat insulating function and an electrically insulating function are provided, and rectangular (or square) end plates 18a, 18b are provided outside the insulator plates 16a, 16b. The end plates 18a, 18b are coupled together, e.g., by a pair of coupling bands 20a, 20b. The coupling bands 20a, 20b are provided at both ends in a direction indicated by an arrow B, and extend in the direction indicated by the arrow A. The coupling bands 20a, 20b hold the energy storage cells 12 of the energy storage cell group 12M together.

For example, each of the energy storage cells 12 is a lithium ion battery, and has a rectangular (or square) shape. An electrode terminal 22a of a positive (+) electrode (or negative (−) electrode) and an electrode terminal 22b of a negative (−) electrode (or positive (+) electrode) are provided on an upper surface (one cell side surface) of each of the energy storage cells 12. The electrode terminal 22a of one of the adjacent energy storage cells 12 and the electrode terminal 22b of the other of the adjacent energy storage cells 12 are electrically connected together by a bus bar 24.

The insulator plates 16a, 16b have a substantially flat plate shape (or the same shape as the separators 14). The end plates 18a, 18b have a substantially flat plate shape. At each of both marginal ends of the end plates 18a, 18b in the direction indicated by the arrow B, a plurality of screw holes 26 are arranged vertically.

The coupling band 20a is formed by a laterally elongated metal plate. As necessary, openings 21a are formed in the coupling band 20a for weight reduction, or for supplying a coolant for cooling the energy storage cells 12. The coupling band 20a has a substantially U-shape in a front view as viewed from one end of the energy storage cell group 12M in the stacking direction. Each of ends 28a of the coupling band 20a in the longitudinal direction (long side direction) is provided on a plate surface to cover a short side of the end plate 18a, 18b.

A plurality of holes 30a are arranged vertically in each end 28a. The holes 30a are provided in alignment with the respective screw holes 26 of the end plates 18a, 18b. Screws 32a are inserted into the holes 30a, and screwed into the screw holes 26 to fix the ends 28a of the coupling band 20a and the end plates 18a, 18b.

At both upper and lower ends of the coupling band 20a, an upper folded portion 34a and a lower folded portion 36a are provided, respectively. The upper folded portion 34a and the lower folded portion 36a are bent inward from the vertical direction to the horizontal direction. The folded portions 34a, 36a extend in the stacking direction of the energy storage cell group 12M. The folded portion 36a holds one of lower corners of the energy storage cell group 12M.

The coupling band 20b has the same structure as the above described coupling band 20a. The constituent elements of the coupling band 20b that are identical to those of the coupling band 20a are labeled with the same reference numerals (with suffix b instead of a), and detailed description thereof is omitted.

In the first embodiment, the energy storage module 10 includes a terminal frame (bus bar or terminal base) 40a electrically connecting the electrode terminal 22a of an energy storage cell 12ea provided at one end in the stacking direction and an output line 38a. Further, the energy storage module 10 includes a terminal frame 40b electrically connecting the electrode terminal 22b of an energy storage cell 12eb provided at another end in the stacking direction and an output line 38b. Hereinafter, the terminal frame 40a will be described in detail. The constituent elements of the terminal frame 40b that are identical to those of the terminal frame 40a are labeled with the same reference numerals, and detailed description thereof is omitted.

Figure 2:
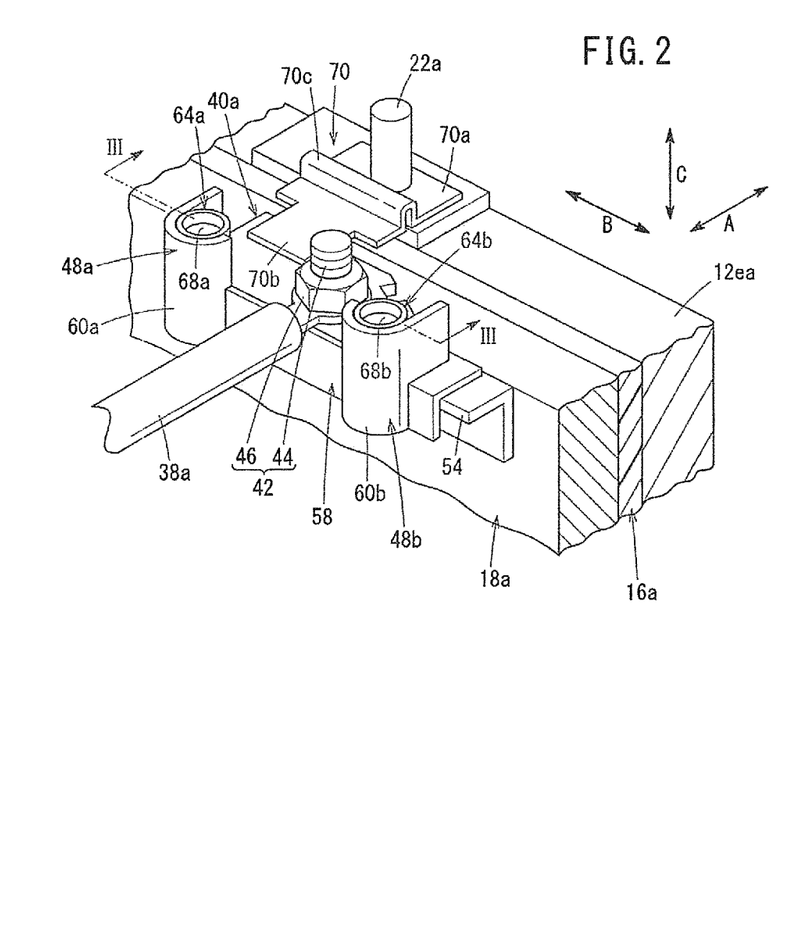
FIG. 2 is a perspective view showing main components of the energy storage module.
Figure 3:
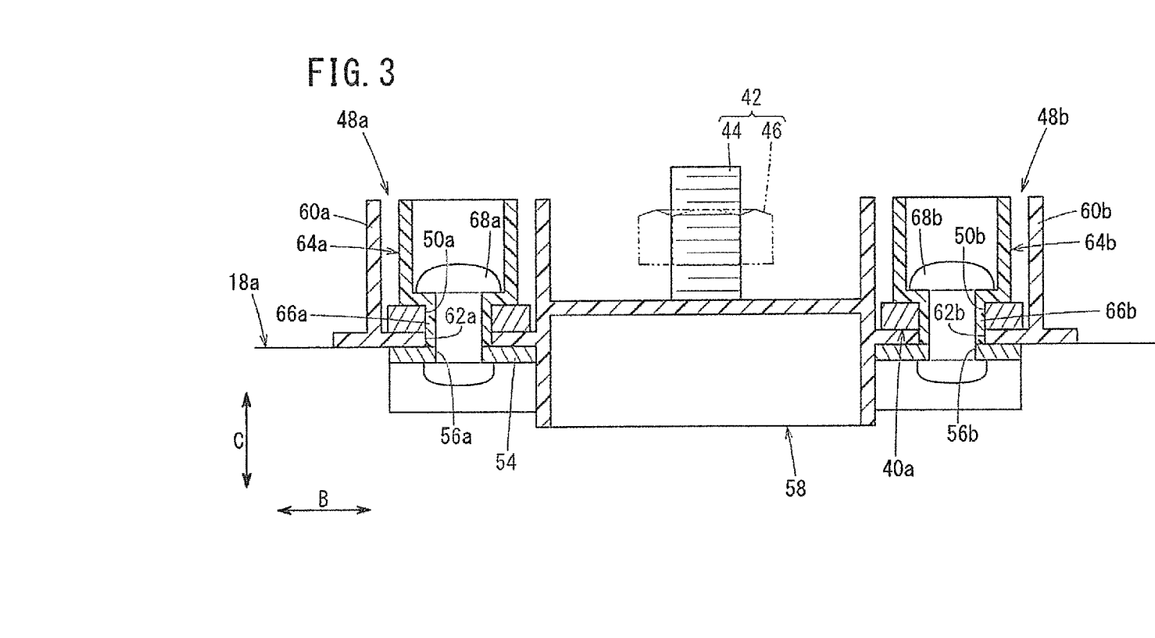
FIG. 3 is a cross sectional view taken along a line in FIG. 2, showing the energy storage module.
Figure 4:
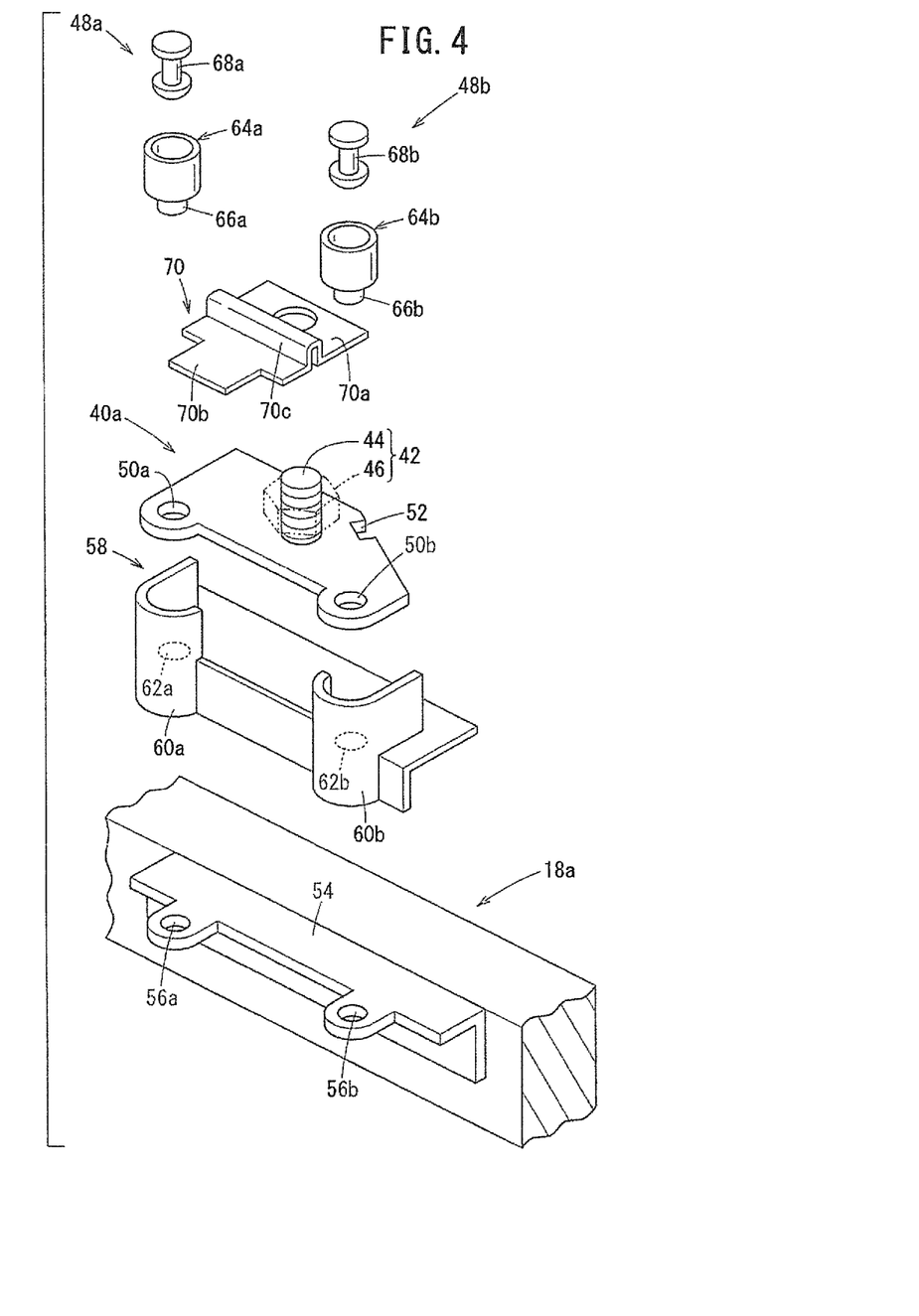
FIG. 4 is an exploded perspective view showing main components at one end plate of the energy storage module.

As shown in FIGS. 2 to 4, the terminal frame 40a is formed by a metal flat plate member, and has a line connector 42. The output line 38a is connected to the line connector 42. For example, the line connector 42 includes a bolt 44, and a nut 46 for screwing the bolt 44 into the nut 46. The terminal frame 40a has a plurality of, e.g., two holes 50a, 50b on both sides of the line connector 42. The holes 50a, 50b form fixing points 48a, 48b. The terminal frame 40a is fixed to the end plate 18a by the fixing points 48a, 48b. A cutout 52 is formed in the terminal frame 40a as rotation locking structure. Another member (not shown) is provided at the cutout 52.

The electrode terminal 22a is provided on one cell side surface (upper surface) of the energy storage cell 12ea, and the terminal frame 40a is provided on one plate side surface (upper surface) of the end plate 18a connected to or placed near the one cell side surface of the energy storage cell 12ea.

As shown in FIG. 4, a flange 54 is formed at an upper portion of the end plate 18a. The flange 54 is bent toward a horizontal direction. Holes 56a, 56b are formed in the flange 54. The holes 56a, 56b are coaxial with the holes 50a, 50b of the terminal frame 40a. The diameter of the holes 56a, 56b is smaller than the diameter of the holes 50a, 50b. For example, a resin case 58 is provided in correspondence with the flange 54.

The case 58 is formed by a plate member, and a pair of substantially semi-cylindrical circular arc shaped portions 60a, 60b are expanded from the case 58. The case 58 has holes 62a, 62b in correspondence with central positions of the circular arc shaped portions 60a, 60b. The holes 62a, 62b are provided coaxially with the holes 50a, 50b and the holes 56a, 56b. The diameter of the holes 62a, 62b is the same as the diameter of the holes 50a, 50b.

Cylindrical collar members 64a, 64b are provided in the circular arc shaped portions 60a, 60b. Small diameter portions 66a, 66b are formed at ends of the collar members 64a, 64b in the axial direction, and the small diameter portions 66a, 66b are fitted to the holes 50a, 50b (see FIG. 3).

The fixing points 48a, 48b have rivets 68a, 68b. The rivets 68a, 68b are inserted from the small diameter portions 66a, 66b to the holes 56a, 56b of the flange 54 to fix the case 58 and the terminal frame 40a to the end plate 18a by caulking. Both of upper and lower ends of the rivet 68a, and both of upper and lower ends of the rivet 68b have large diameters.

As shown in FIGS. 2 and 4, in the energy storage module 10, a bus bar member 70 electrically connecting the electrode terminal 22a and the terminal frame 40a is provided, and the bus bar member 70 includes a plurality of curves.

The bus bar member 70 is provided separately from the terminal frame 40a. At one end of the bus bar member 70, a cell side plate 70a is provided. The cell side plate 70a is welded to the electrode terminal 22a. At the other end of the bus bar member 70, an output side plate 70b is provided. The output side plate 70b is welded to the terminal frame 40a. The curves between the cell side plate 70a and the output side plate 70b form a curved portion 70c having a U-shape in cross section. The bus bar member 70 is thinner than the terminal frame 40a.

At the time of producing this energy storage module 10, as shown in FIG. 1, a plurality of energy storage cells 12 are stacked together. The insulator plates 16a, 16b are provided at both ends of the energy storage cells 12 in the stacking direction, and the end plates 18a, 18b are provided outside the insulator plates 16a, 16b. Further, the ends 28a, 28b of the pair of coupling bands 20a, 20b are fixed to the end plates 18a, 18b using the screws 32a, 32b.

On the part of the terminal frame 40a, the output side plate 70b of the bus bar member 70 is welded to the terminal frame 40a beforehand. Then, as shown in FIGS. 2 to 4, the case 58 is provided on the flange 54 of the end plate 18a, and the terminal frame 40a is stacked on the case 58.

Further, as shown in FIG. 3, the small diameter portions 66a, 66b of the collar members 64a, 64b are inserted into both of the holes 50a, 50b of the terminal frame 40a and the holes 62a, 62b of the case 58. In this state, the rivets 68a, 68b are inserted from the inside of the small diameter portions 66a, 66b to the holes 56a, 56b of the flange 54. In this manner, the case 58 and the terminal frame 40a are fixed to the end plate 18a by the fixing points 48a, 48b.

Then, the cell side plate 70a of the bus bar member 70 is welded to the electrode terminal 22a of the energy storage cell 12ea provided at one end in the stacking direction (see FIG. 2). Thereafter, the output line 38a is connected to the line connector 42 provided at the terminal frame 40a. The line connector 42 has a bolt 44 and a nut 46. The connector of the output line 38a is connected to the bolt 44, and the bolt 44 is screwed into the nut 46.

As in the case of the end plate 18a, at the end plate 18b, the output line 38b and the electrode terminal 22b of the energy storage cell 12eb are electrically connected together through the terminal frame 40b.

In the first embodiment, the terminal frame 40a electrically connecting the electrode terminal 22a of the energy storage cell 12ea and the output line 38a is fixed to the end plate 18a, by the plurality of, e.g., two fixing points 48a, 48b. Specifically, as shown in FIG. 3, the rivets 68a, 68b are inserted from the inside of the small diameter portions 66a, 66b to the holes 56a, 56b of the flange 54, and the case 58 and the terminal frame 40a are fixed to the end plate 18a.

Therefore, at the time of fixing the output line 38a to the line connector 42 by tightening the bolt 44 and the nut 46, deformation (rotation) of the terminal frame 40a itself supported at both ends in the presence of the input of the tightening torque, is suppressed. Therefore, even if the terminal frame 40a and the output line 38a are connected after the electrode terminal 22a of the energy storage cell 12ea and the terminal frame 40a are connected, the electrode terminal 22a is not damaged.

Further, at the time of removing the output line 38a, and connecting the output line 38a again, it is not required to access the electrode terminal 22a of the energy storage cell 12ea. Accordingly, it becomes possible to simplify, and improve the efficiency of operation such as maintenance operation as a whole. Further, damages of the electrode terminal 22a can be suppressed as much as possible. Moreover, structure of the fixing points 48a, 48b is simplified, and reduction in the size, weight, and the production cost of the energy storage module 10 as a whole can be achieved easily.

Further, in the first embodiment, the bus bar member 70 is molded to have a plurality of curves, e.g., forming the curved portion 70c having a U-shape in cross section. In the structure, at the time of tightening the output line 38a, by elastic operation of the curved portion 70c, it becomes possible to effectively reduce the torque inputted to the electrode terminal 22a of the energy storage cell 12ea.

Further, the bus bar member 70 is thinner than the terminal frame 40a. As a result, it is possible to reduce the load applied to the electrode terminal 22a and the welded portion of the bus bar member 70 due to assembling and tightening at the time of maintenance operation further reliably.

Figure 5:
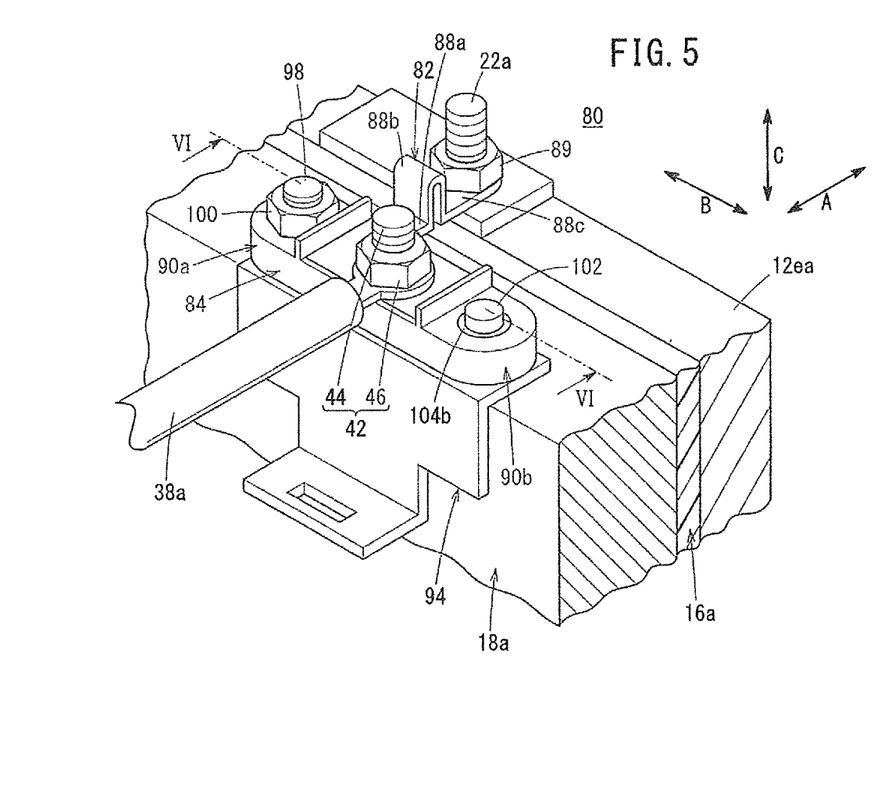
FIG. 5 is a perspective view showing main components of an energy storage module according to a second embodiment of the present invention.

FIG. 5 is a perspective view showing main components of an energy storage module 80 according to a second embodiment of the present invention. The constituent elements of the energy storage module 80 that are identical to those of the energy storage module 10 according to the first embodiment are labeled with the same reference numerals, and detailed description thereof is omitted.

In the energy storage module 80, a terminal frame (bus bar or terminal base) 82 for electrically connecting the electrode terminal 22a of the energy storage cell 12ea and the output line 38a is fixed to the end plate 18a. Though not shown, a terminal frame similar to the terminal frame 82 is fixed to the end plate 18b as well.

Figure 6:
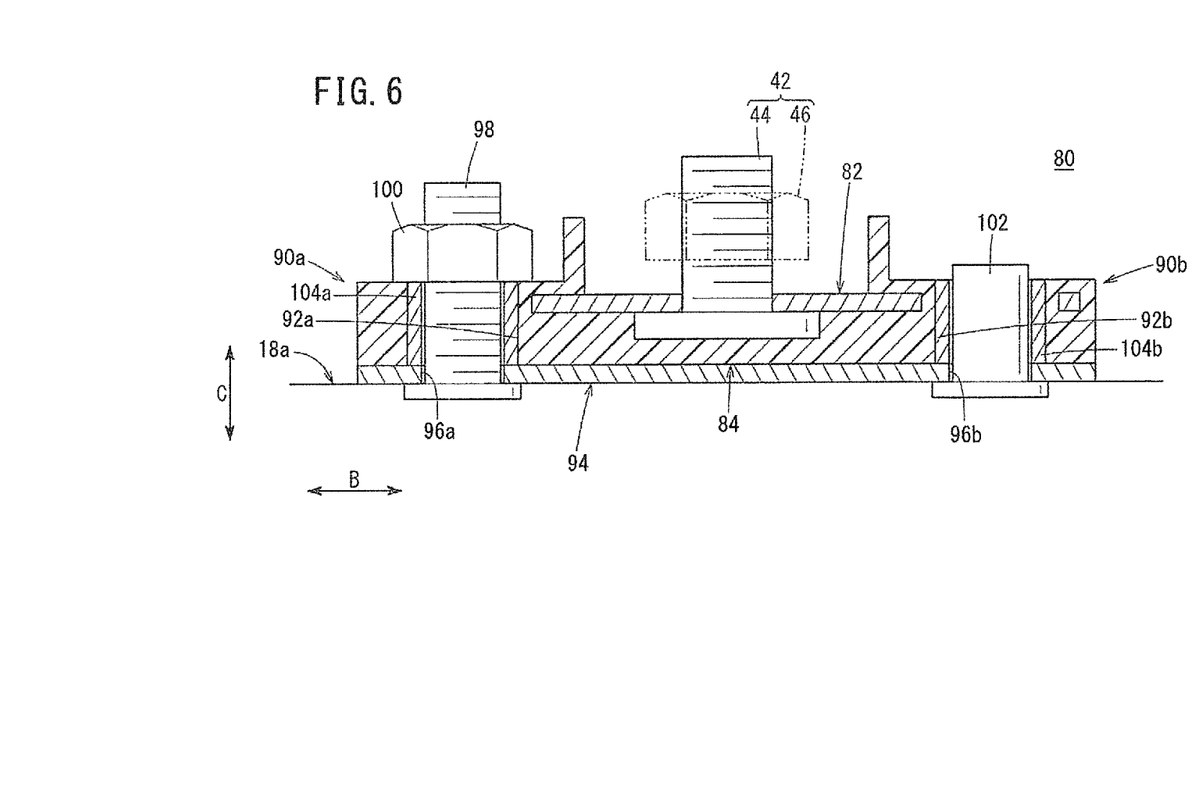
FIG. 6 is a cross sectional view taken along a line VI-VI in FIG. 5, showing the energy storage module.
Figure 7:
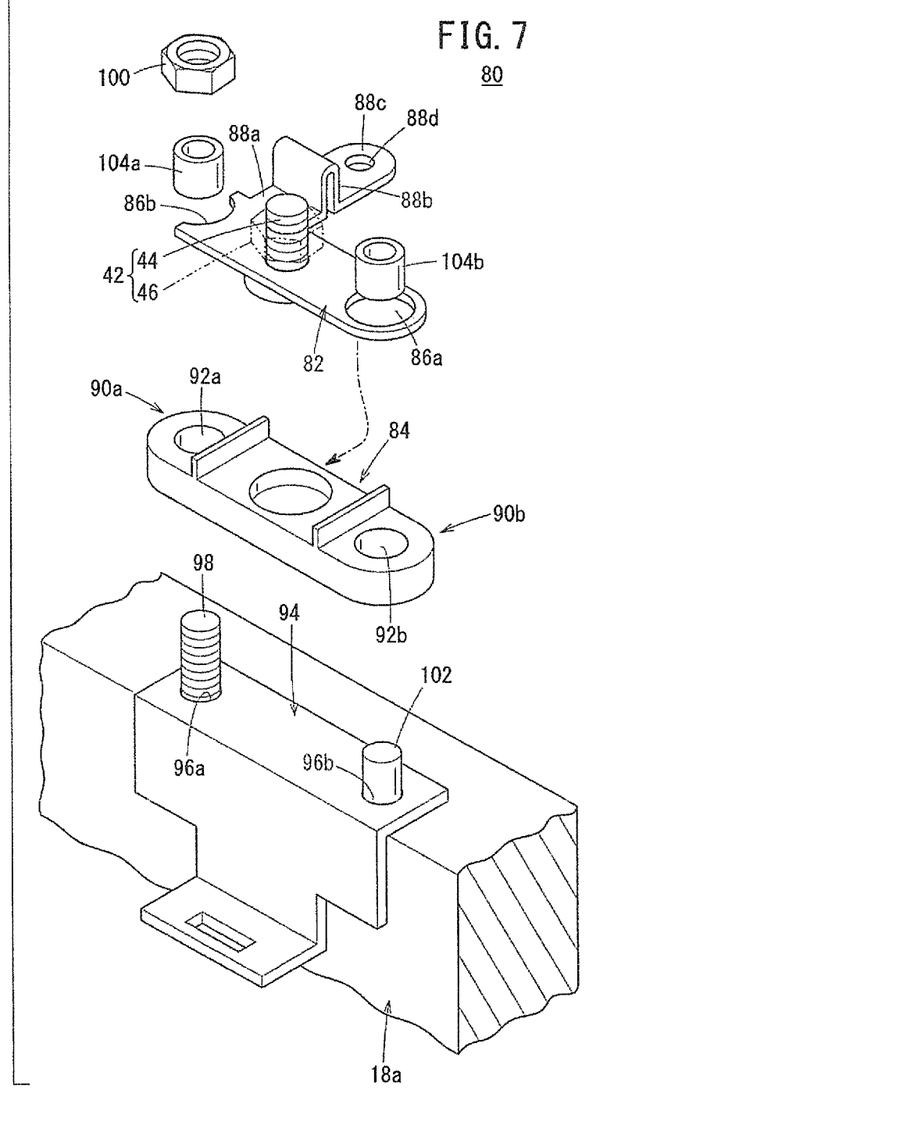
FIG. 7 is an exploded perspective view showing main components at one end plate of the energy storage module.

As shown in FIGS. 5 to 7, the terminal frame 82 is formed integrally with a resin case 84 by insert molding. In FIG. 7, it should be noted that the terminal frame 82 and the case 84 are shown separately for the purpose of explanation. The terminal frame 82 is formed by a metal flat plate member, and has a line connector 42 connected to an output line 38a. As shown in FIG. 7, the terminal frame 82 has a substantially rectangular shape, and has a hole 86a at one end in the longitudinal direction and has a substantially semi-circular curved cutout portion 86b at the other end in the longitudinal direction.

An output side plate 88a, curves forming a curved portion 88b having a U-shape in cross section, and a cell side plate 88c are provided integrally on one side surface of the terminal frame 82 in a continuous manner. The cell side plate 88c has a hole 88d, and the electrode terminal 22a of the energy storage cell 12ea is inserted into the hole 88d. The electrode terminal 22a as a screw shaft is screwed into a nut 89 (see FIG. 5).

The case 84 has a substantially rectangular parallelepiped shape, and the case 84 has a plurality of, e.g., two holes 92a, 92b at both ends of the case 84 in a longitudinal direction (both sides of the line connector 42). The holes 92a, 92b form fixing points 90a, 90b. At the terminal frame 82, the hole 86a is provided around a hole 92b, and the curved cutout portion 86b is formed at least around a portion of the hole 92a.

As shown in FIGS. 5 and 7, a bracket 94, e.g., formed by bending a metal plate is welded to an upper portion of the end plate 18a. Holes 96a, 96b are formed on an upper horizontal surface of the bracket 94. The holes 96a, 96b are provided coaxially with the holes 92a, 92b of the case 84 (see FIG. 6).

A bolt 98 is inserted into the hole 96a from the back surface of the bracket 94, and the bolt 98 is screwed into a nut 100. A pin 102 is inserted into the hole 96b from the back surface of the bracket 94. The bolt 98 and the pin 102 are welded to the back surface of the bracket 94.

Cylindrical collar members 104a, 104b are formed integrally at the holes 92a, 92b of the case 84 (see FIG. 6). The bolt 98 is inserted into the collar member 104a, and the front end of the bolt 98 is screwed into a nut 100. A pin 102 is inserted into a collar member 104b. In the structure, the case 84 formed integrally with the terminal frame 82 is fixed to the end plate 18a through the bracket 94.

In the second embodiment, the terminal frame 82 for electrically connecting the electrode terminal 22a of the energy storage cell 12ea and the output line 38a is fixed to the end plate 18a by the plurality of, e.g., two fixing points 90a, 90b. Therefore, the same advantages as in the case of the first embodiment are obtained. For example, it becomes possible to simplify, and improve the efficiency of operation such as maintenance operation as a whole. Further, damages of the electrode terminal 22a can be suppressed as much as possible.

Figure 8:
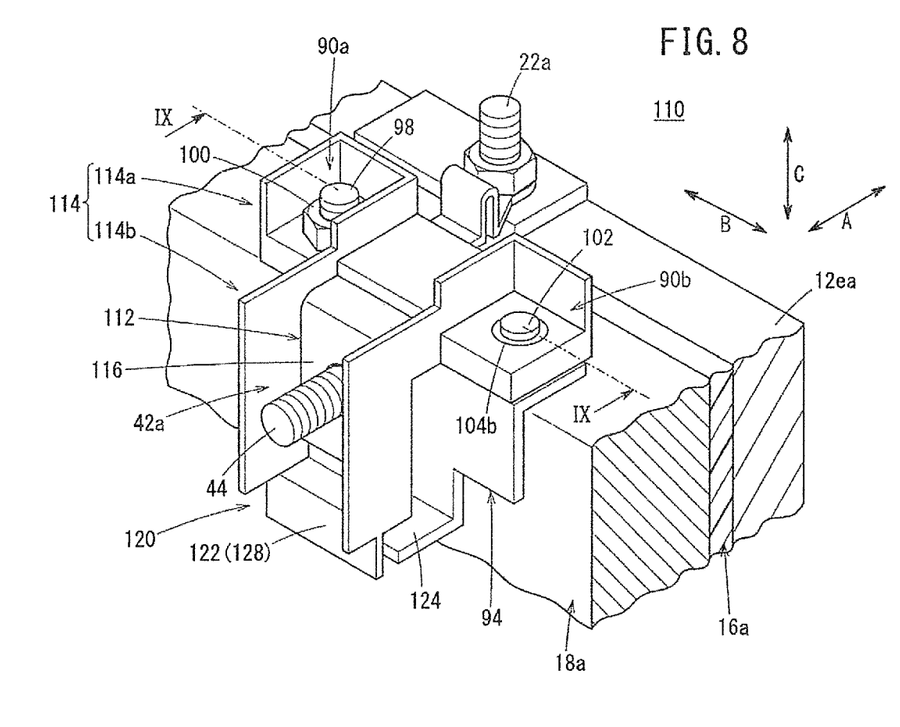
FIG. 8 is a perspective view showing main components of an energy storage module according to a third embodiment of the present invention.

FIG. 8 is an exploded perspective view showing main components of an energy storage module 110 according to a third embodiment of the present invention. The constituent elements of the energy storage module 110 that are identical to those of the energy storage module 80 according to the second embodiment are labeled with the same reference numerals, and detailed description thereof is omitted.

In the energy storage module 110, a terminal frame (bus bar or terminal base) 112 for electrically connecting the electrode terminal 22a of the energy storage cell 12ea and the output line 38a is fixed to the end plate 18a. Though not shown, it should be noted that a terminal frame similar to the terminal frame 112 is fixed to the end plate 18b as well.

Figure 9:
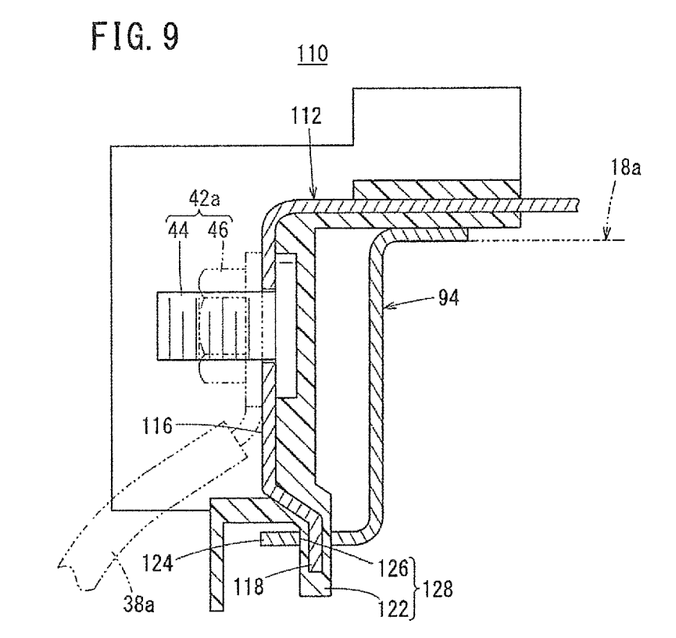
FIG. 9 is a cross sectional view taken along a line IX-IX in FIG. 8, showing the energy storage module.
Figure 10:
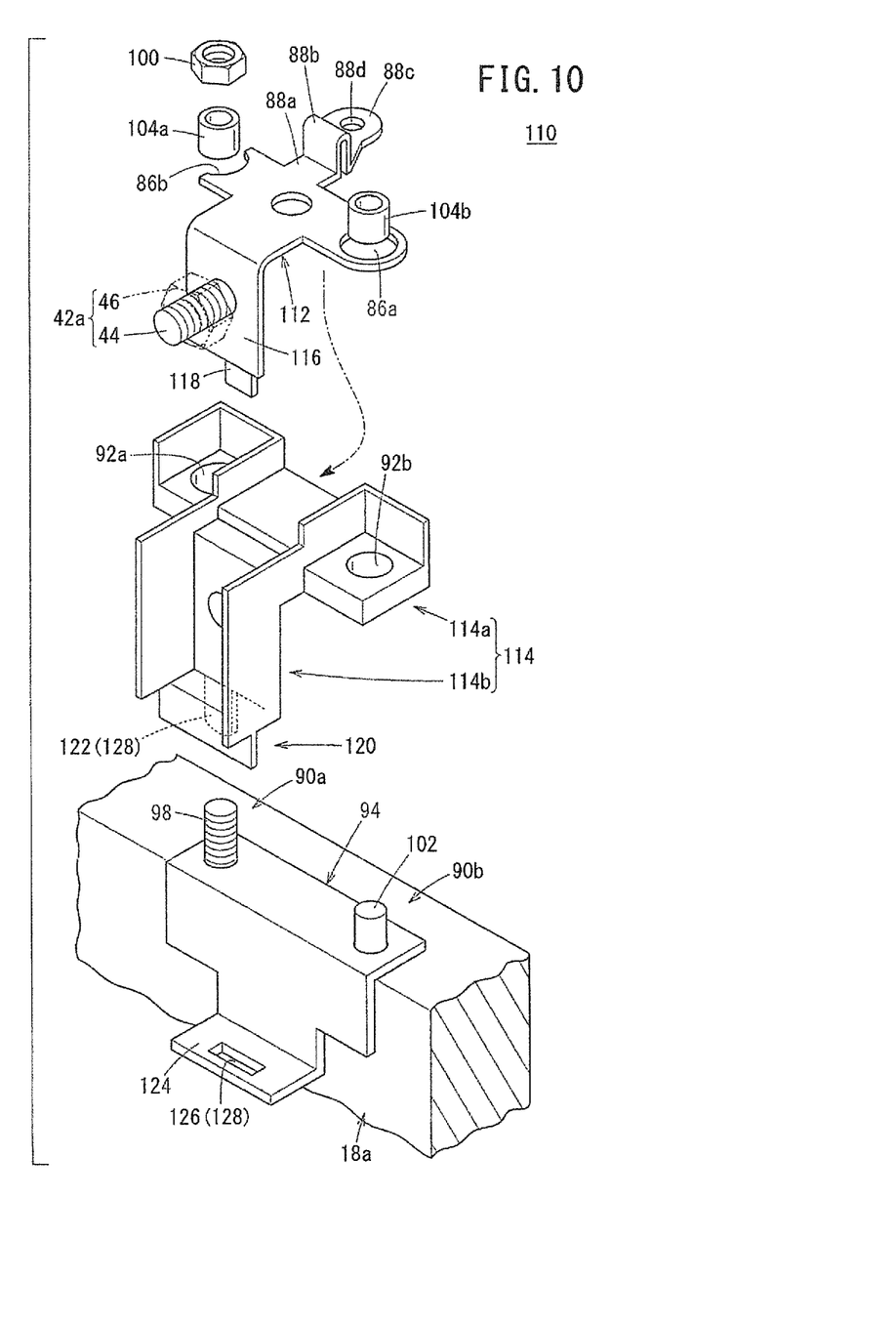
FIG. 10 is an exploded perspective view showing main components at one end plate of the energy storage module.

As shown in FIGS. 8 to 10, the terminal frame 112 is formed integrally with a resin case 114 by insert molding. In FIG. 10, it should be noted that the terminal frame 112 and the case 114 are shown separately for the purpose of explanation. The terminal frame 112 is formed by a metal flat plate member. An attachment surface 116 is formed on a side surface of the terminal frame 112 opposite to the output side plate 88a. The attachment surface 116 is bent downward from the horizontal direction.

The attachment surface 116 is in parallel with the plate surface of the end plate 18a. A line connector 42a is provided on the attachment surface 116. The axial direction of the line connector 42a is a horizontal direction perpendicular to the attachment surface 116, i.e., the same direction as the stacking direction of the energy storage cells 12. A rectangular extension 118 extends downwardly from a lower end of the attachment surface 116.

The case 114 includes a horizontal body 114a having substantially the same shape as the case 84 according to the second embodiment, and a vertical body 114b extending from one end of the horizontal body 114a in a vertically downward direction. A rectangular pin portion 122 is formed at a lower portion of the vertical body 114b. The extension 118 of the terminal frame 112 is embedded in the rectangular pin portion 122.

As shown in FIG. 10, a bracket 94 is bent downward from an upper horizontal surface, and has a flat plate portion 124 at its lower end. The flat plate portion 124 is bent toward a horizontal direction. The flat plate portion 124 has a rectangular hole 126. The rectangular pin portion 122 is inserted into the rectangular hole 126 to form a fixing point 128. The fixing point 128 is a plate surface fixing point provided on a plate surface of the end plate 18a intersecting with the stacking direction of the energy storage cells 12.

The axial directions of the electrode terminal 22a, the fixing points 90a, 90b (plate side fixing point) and the fixing point 128 (plate surface fixing point) are the same. It should be noted that the axial directions of any two of the electrode terminal 22a, the fixing points 90a, 90b, and the fixing point 128 may be the same.

In this third embodiment, the same advantages as in the cases of the first and second embodiments are obtained. Further, the axial direction of the line connector 42a is the same as the stacking direction of the energy storage cells 12. Therefore, at the time of removing the output line 38a, and connecting the output line 38a again, it is not required to access a surface on the side of the electrode terminal 22a of the energy storage cell 12ea. Accordingly, reduction in the space required for mounting the energy storage cells can be achieved.

Further, the axial directions of the electrode terminal 22a, the fixing points 90a, 90b, and the fixing point 128 are the same. Accordingly, operation can be performed in the same direction, and assembling operation can be performed with a reduced number of steps.

Figure 11:
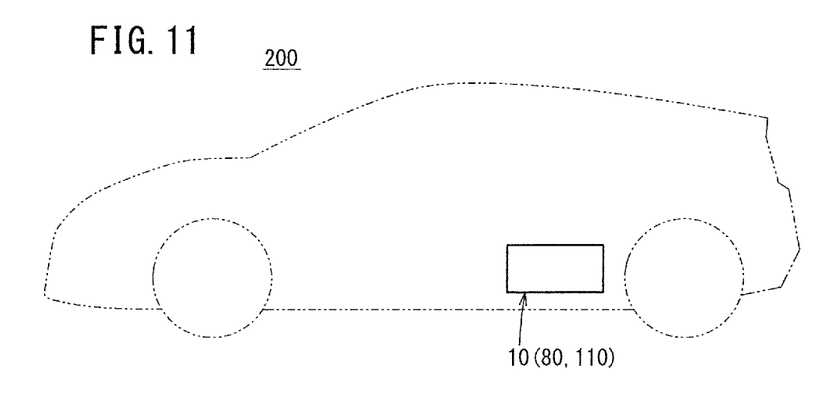
FIG. 11 is a schematic view showing an electric vehicle in which the energy storage module according to the present invention is mounted.
Figure 12:
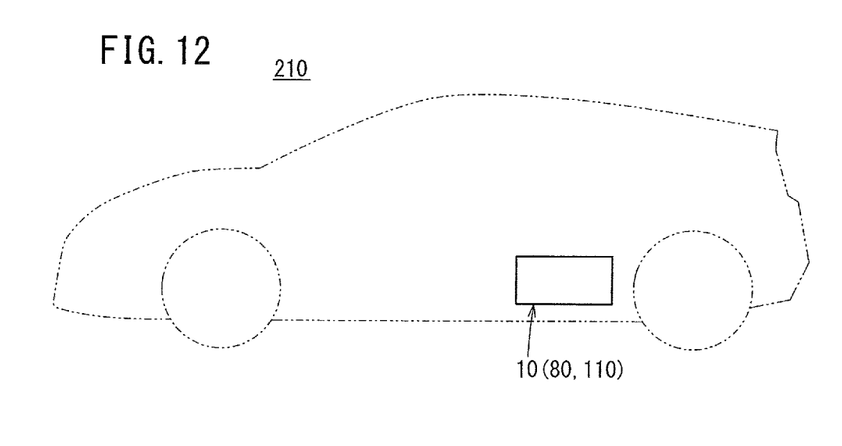
FIG. 12 is a schematic view showing a hybrid vehicle in which the energy storage module according to the present invention is mounted.

Each of the energy storage modules 10, 80, 110 may be mounted in an electrically driven vehicle (electric motor vehicle) such as an electric vehicle 200 (see FIG. 11) or a hybrid vehicle 210 (see FIG. 12).

While the invention has been particularly shown and described with a reference to preferred embodiments, it will be understood that variations and modifications can be effected thereto by those skilled in the art without departing from the scope of the invention as defined by the appended claims.

What is claimed is:

1. An energy storage module comprising:
   an energy storage cell group comprising a plurality of energy storage cells stacked in a stacking direction; and
   a pair of end plates provided at both ends of the energy storage cell group in the stacking direction to hold the energy storage cells of the energy storage cell group together,
   wherein a terminal frame is provided at the end plate in order to electrically connect an electrode terminal of an energy storage cell provided at an end of the plurality of energy storage cells in the stacking direction and an output line, and
   wherein the terminal frame has a line connector connected to the output line, and the terminal frame is fixed to the end plate by a plurality of fixing points, the terminal frame is attached to the end plate via an intervening member, the terminal frame comprises:
- a first portion that is disposed across from one plate side surface of the end plate, the one plate side surface being perpendicular to the stacking direction; and
- a second portion that is disposed across from an end surface that is perpendicular to the one plate side surface, the fixing points are fixed to the first direction.

2. The energy storage module according to claim 1, wherein the energy storage cells and the end plates have a rectangular shape;
- the electrode terminal is provided on one cell side surface of the energy storage cell, and the terminal frame is provided on the one plate side surface connected to the one cell side surface; and
- the line connector is positioned on the terminal frame between two of the plurality of fixing points.

3. The energy storage module according to claim 1, wherein the fixing points comprise any of screw tightening, caulking, and fitting of a pin and a hole, or any combination thereof.

4. The energy storage module according to claim 1, further comprising a bus bar member electrically connecting the electrode terminal and the terminal frame, wherein the bus bar member comprises a plurality of curves.

5. The energy storage module according to claim 4, wherein the bus bar member is provided separately from the terminal frame, one end of the bus bar member is welded to the electrode terminal, and another end of the bus bar member is connected to the terminal frame; and
the bus bar member is thinner than the terminal frame.

6. The energy storage module according to claim 4, wherein the curves of the bus bar member comprise a curved portion having a U-shape in cross section.

7. The energy storage module according to claim 1, wherein an axial direction of the line connector is parallel to the stacking direction of the energy storage cells.

8. The energy storage module according to claim 7, wherein any of the plurality of fixing points is provided as a plate side surface fixing point on one plate side surface of the end plate connected to a cell surface of one of the energy storage cells on which the electrode terminal is provided; and
- any of others of the plurality of fixing points is provided as a plate surface fixing point on a plate surface intersecting with the stacking direction of the energy storage cells;
- the plate side surface fixing point comprises tightening by a bolt and a nut or caulking; and
- the plate surface fixing point comprises fitting of a pin and a hole.

9. The energy storage module according to claim 8, wherein all or two of axial directions of the electrode terminal, the plate side surface fixing point, and the plate surface fixing point are same.

10. The energy storage module according to claim 1, wherein the terminal frame has a rotation locking structure.

11. An electric vehicle comprising the energy storage module according to claim 1.

12. A hybrid vehicle comprising the energy storage module according to claim 1.

* * * * *